US006414283B1

(12) United States Patent
McNamara

(10) Patent No.: US 6,414,283 B1
(45) Date of Patent: Jul. 2, 2002

(54) CLOSED LOOP HEATING CONTROL FOR FOOD WARMER

(75) Inventor: Albert C. McNamara, San Antonio, TX (US)

(73) Assignee: Ultrafryer Systems, Inc., San Antonio, TX (US)

( * ) Notice: Subject to any disclaimer, the term of this patent is extended or adjusted under 35 U.S.C. 154(b) by 0 days.

(21) Appl. No.: 09/376,508

(22) Filed: Aug. 18, 1999

(51) Int. Cl.[7] .................................................. H05B 1/02
(52) U.S. Cl. ........................ 219/486; 219/413; 219/383; 219/395; 392/416
(58) Field of Search ................................. 219/483–486, 219/411–415, 396, 395, 388; 392/416; 307/39–41

(56) References Cited

U.S. PATENT DOCUMENTS

| | | | |
|---|---|---|---|
| 3,327,092 A | | 6/1967 | Wilson ........................ 219/214 |
| 3,690,175 A | | 9/1972 | Butts ........................... 73/343 R |
| 3,693,536 A | * | 9/1972 | Carville et al. ................ 99/386 |
| 4,164,643 A | * | 8/1979 | Peart et al. .................... 219/411 |
| 4,990,749 A | | 2/1991 | Devine et al. ................ 219/385 |
| 5,045,671 A | | 9/1991 | Kanaya et al. ............... 219/411 |
| 5,296,683 A | * | 3/1994 | Burkett et al. ............... 219/497 |
| 5,347,104 A | | 9/1994 | Morishima et al. .......... 219/451 |
| 5,550,352 A | * | 8/1996 | Geeroms ...................... 219/497 |
| 5,990,454 A | * | 11/1999 | Westerberg et al. |

FOREIGN PATENT DOCUMENTS

DE        DE 43 02 190 A1        7/1994

OTHER PUBLICATIONS

Yoshinobu, "Electric Broiling Device," *Patent Abstracts of Japan*, pub. #3125820, 1991, Japanese patent application No. JP 01263301, Filed Oct. 09, 1989.

Sumiko, "Device for Detecting Temperature of food." *Patent Abstracts of Japan*, pub. 07035623, 1995, Japanese patent application No. JP 05168006, filed Jul. 07, 1993.

* cited by examiner

*Primary Examiner*—Mark Paschall
(74) *Attorney, Agent, or Firm*—Banner & Witcoff, Ltd

(57) ABSTRACT

A food warmer having closed loop heating control has a temperature sensor in a warming zone of the food warmer. The temperature sensor has a rate of heat absorption and a rate of heat loss substantially the same as a food product contained in the warming zone. First and second heat sources provide heat to the warming zone. The heat required to maintain the warming zone at a desired temperature requires heat from both the first and second heat sources. The first heat source is operated continuously while the second heat source is activated and deactivated in closed loop fashion based on input from the temperature sensor to maintain a desired set point temperature of the warming zone.

17 Claims, 4 Drawing Sheets

CLOSED LOOP HEATING CONTROL FOR FOOD WARMER

INTRODUCTION

The present invention relates to a food warmer, and more particularly, to an improved food warmer having closed loop heating control.

BACKGROUND

Food warmers are commercially used by restaurants, institutional kitchens, and fast food establishments for maintaining a variety of cooked food products, such as french fries, fish, potatoes, fried chicken, and the like, at a desired temperature. Food warmers typically use lamps with radiation in the visible and infrared spectrums, or radiant heaters with output in the infrared spectrum in combination with lamps which provide display lighting.

The food warmers may have an open loop control system which sets the output of the lamps and/or heaters to provide a temperature in the food warmer based on conditions found at the site, e.g., available voltage, airflow around the food warmer, and the geometry of the food warmer. Open loop control of radiant lamps is not desirable, since the lighting level in the food warmer and the color of food product contained in the food warmer is more strongly affected by control adjustment than the heat output, and is also more noticeable to the customer. Open loop control also does not take into account changes in the operating environment. Specifically, open loop control cannot compensate for voltage fluctuations which may occur as neighboring users go on an off line nor for air temperature fluctuations which may occur, for example, when a drive through window or doors of a restaurant are opened and closed.

Closed loop control has been difficult to implement in food warmers because different sensor types present various problems. Some sensors detect the air temperature as is done in an oven, however, heating in a food warmer is produced by radiation, not by hot air. Some sensors may sense the temperature of a portion of the food warmer itself, which receives and transmits heat differently than the food product. Other sensors use infrared heat detection to view the food product and then calculate the temperature. However, the emissivity used in such a calculation is different for the food product and the food warmer itself and the infrared detection device may at certain times view one or the other, or a combination of both, resulting in erroneous readings.

It is an object of the present invention to provide a closed loop heat control for a food warmer which reduces or wholly overcomes some or all of the aforesaid difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide a food warmer having closed loop heating control for more accurate control of a desired set point temperature.

In accordance with a first aspect, a heating control for a food warmer has a housing having a warming zone and a temperature sensor in the warming zone. The temperature sensor has a rate of heat absorption and a rate of heat loss substantially the same as a selected food product. A first heat source provides heat continuously to the warming zone. A second heat source provides heat to the warming zone in intermittent fashion to maintain a desired set point temperature of the warming zone. The heat required to maintain the warming zone at a desired temperature requires heat from both the first heat source and the second heat source.

In accordance with another aspect, a heating control for a food warmer has a housing having a warming zone and a temperature sensor in the warming zone. A light source warms and illuminates food product contained in the warming zone, and the light source is operated continuously while food product is in the warming zone. A radiant heater warms food product in the warming zone, and the heat required to maintain the food product at a desired temperature requires heat from both the light source and the radiant heater, A closed loop controller is responsive to a signal from the temperature sensor to control operation of the radiant heater to maintain a desired set point temperature of the warming zone.

In accordance with another aspect, a heating control for a food warmer has a housing having a hood and a base. The base has a warming zone and a temperature sensor is located in the warming zone. A plurality of lamps are secured to the hood to provide light and heat to food product contained in the warming, zone. The lamps are operated continuously while food product is in the warming zone. Each of a plurality of lamp reflectors is positioned adjacent a lamp to direct light and heat toward the warming zone. A radiant heater is secured to the hood to provide heat to warm the food product in the warming zone. The heat required to maintain the food product at a desired temperature requires heat from both the lamps and the radiant heater. A radiant heater reflector is adjacent the radiant heater to direct heat toward the warming, zone. A closed loop controller is responsive to a signal from the temperature sensor to control operation of the radiant heater to maintain a desired set point temperature of the warming zone.

In accordance with yet another aspect, a heating control for a food warmer has a housing having a warming zone. A temperature sensor in the warming zone has a rate of heat absorption and a rate of heat loss substantially the same as a selected food product. A radiant heater warms a food product in the warming zone. A closed loop controller is responsive to a signal from the temperature sensor to control operation of the radiant heater to maintain a desired set point temperature of the warming zone.

From the foregoing disclosure, it will be readily apparent to those skilled in the art, that is, those who are knowledgeable or experienced in this area of technology, that the present invention provides a significant technological advance. Preferred embodiments of the food warmer with closed loop heat control allow more accurate control of the temperature of food product contained in the food warmer, taking into account fluctuations in operating parameters and environmental conditions. These and additional features and advantages of the invention disclosed here will be further understood from the following detailed disclosure of certain preferred embodiments.

BRIEF DESCRIPTION OF THE DRAWINGS

Certain preferred embodiments are described in detail below with reference to the appended drawings wherein.

Figure 1:
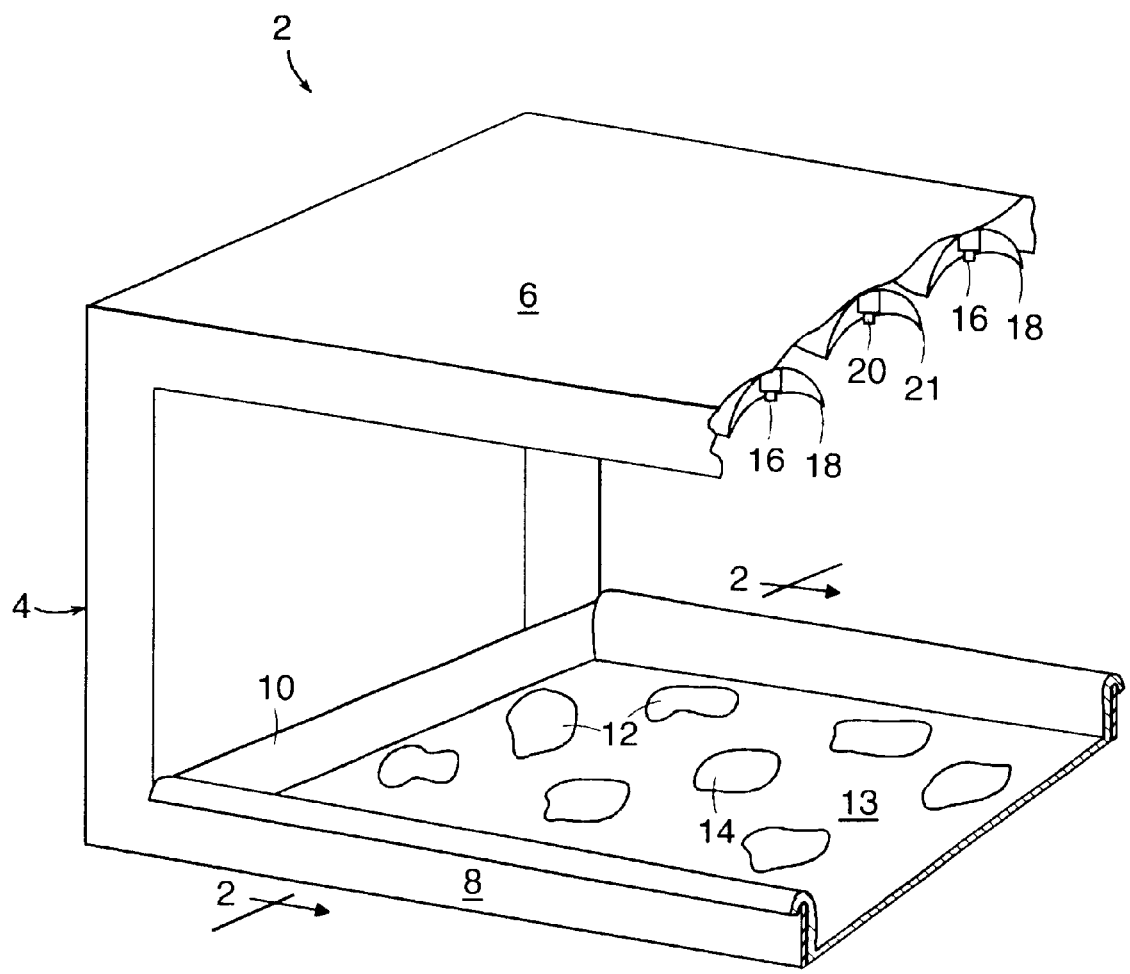
FIG. 1 is a schematic perspective view, shown partially broken away, of a food warmer according to the present invention.

The figures referred to above are not drawn necessarily to scale and should be understood to present a representation of the invention, illustrative of the principles involved. Some features of the food warmer depicted in the drawings have been enlarged or distorted relative to others to facilitate explanation and understanding. The same reference numbers are used in the drawings for similar or identical components and features shown in various alternative embodiments. Food warmers having closed loop heat control, as disclosed herein, will have configurations and components determined, in part, by the intended application and environment in which they are used.

DETAILED DESCRIPTION OF CERTAIN PREFERRED EMBODIMENTS

Referring to FIG. 1, a food warmer according to the present invention is shown generally by reference numeral 2. Food warmer 2 has a housing 4 comprising a hood 6 and a base 8. Tray 10 is positioned within base 8 and contains food product 12 within a warming zone 13. Warming zone 13 is a zone, or area, within housing 4, typically at the bottom of housing 4 where tray 10 rests. Warming zone 13 is heated in order to maintain a desired temperature of food product 12. Food product 12 may be, for example, french fries, fish, potatoes, fried chicken, and the like. Temperature sensor 14 is disposed in warming zone 13 of tray 12.

Figure 2:
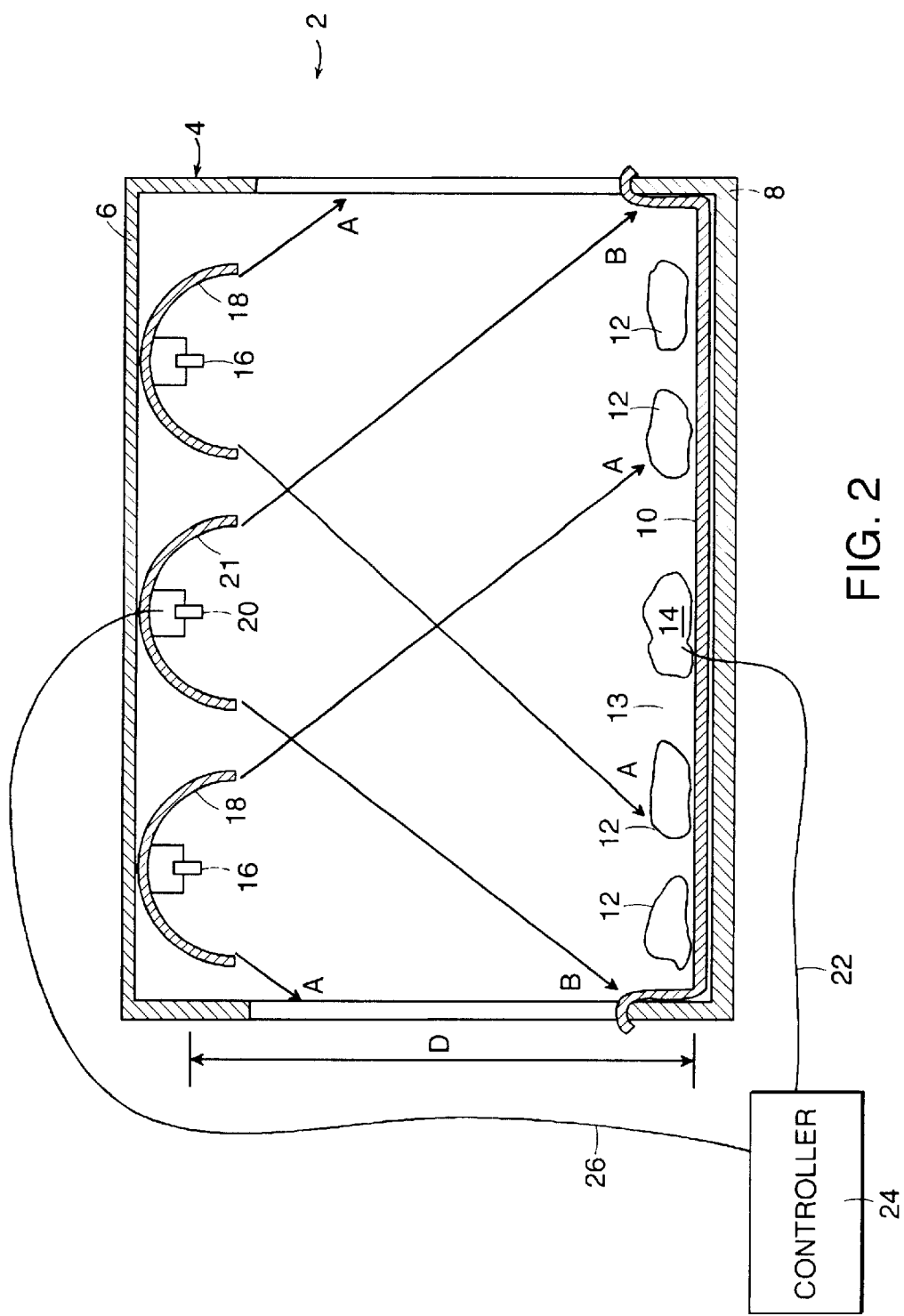
FIG. 2 is a schematic section view, taken along line 2—2 of FIG. 1, of the food warmer of FIG. 1.

As seen in FIG. 2, a series of lamps 16 are secured to hood 6 and project visible light and heat over food product 12 in warming zone 13. Reflectors 18 are positioned above lamps 16 and direct heat and light from lamps 16 such that substantially the entire area of warming zone 13 about food product 12 is illuminated and heated by lamps 16, as seen by arrows A. Lamps 16 are operated continuously, providing a steady flow of heat and light to food product 12. By operating lamps 16 continuously, the appearance of food product 12, which is affected by light from lamps 16, remains consistent. Lamps 16 may be, in certain preferred embodiments, quartz, or halogen, lamps. Other suitable lamps include non-quartz incandescent lamps, and reflector lamps. Lamps 16, in certain preferred embodiments, are 375 watt quartz lamps. Other suitable operating parameters of lamps 16 will become readily apparent to those skilled in the art, given the benefit of this disclosure. Reflector 18 may be painted or covered with an enamel, or formed of a specular or semi-specular material. A preferred material for reflector 18 is aluminum. In certain preferred embodiments, the surface of reflector 18 is embossed to reduce the possibility of hot spots being created. Other suitable materials for reflector 18 which will adequately reflect heat from lamp 16 to food product 12 will become readily apparent to those skilled in the art, given the benefit of this disclosure. When reflector lamps are used, a separate reflector 18 is, naturally, not required.

A radiant heater 20 and corresponding reflector 21 are also secured to hood 6, projecting heat across substantially the entire area of warming zone 13 about food product 12, as seen by arrows B. Radiant heater 20 preferably emits a negligible amount of energy in the visible range, thereby minimizing any effect on the coloration of food product 12. Radiant heater 20 may be a flat panel heater, a ceramic heater, or a sheathed heater. Suitable heaters are manufactured by Ogden of Arlington Heights, Ill. and Watlow of St. Louis, Mo. Other suitable radiant heaters will become readily apparent to those skilled in the art, given the benefit of this disclosure. Reflector 21 may be painted or covered with an enamel, or formed of a specular or semi-specular material. A preferred material for reflector 21 is aluminum. In certain preferred embodiments, the surface of reflector 21 is embossed to reduce the possibility of hot spots being created. Other suitable materials for reflector 21 which will adequately reflect heat from radiant heater 20 to food product 12 will become readily apparent to those skilled in the art, given the benefit of this disclosure.

In one preferred embodiment, the distance D between tray 10 and lamps 16 and heater 20 is approximately 20". This distance may vary based on the size of food warmer 2, the type of food product 12, and operating conditions of food warmer 2. A suitable distance D will become readily apparent to those skilled in the art, given the benefit of this disclosure.

The heat from lamps 16 alone is insufficient to maintain the desired temperature of warming zone 13 and food product 12. The heat from radiant heater 20 is also insufficient to maintain the desired temperature of warming zone 13 and food product 12. Accordingly, both lamps 16 and radiant heater 20 are required in order to maintain the desired temperature of warming zone 13 and food product 12. The combined heat from both lamps 16 and radiant heater 20 must exceed the heat required under normal operating conditions so that the system can provide sufficient heat under adverse or extreme circumstances. Radiant heater 20 is operated intermittently through the use of closed loop control in order to maintain warming zone 13 and food product 12 at a desired temperature. Closed loop control, as used herein, refers to a system wherein an output value, e.g., the temperature sensed by temperature sensor 14, is controlled by feeding back the output value and using it to manipulate an input, e.g., the heat produced by radiant heater 20, to bring the output value closer to a desired value. A closed loop control system accordingly operates continuously in this manner to maintain the desired output value.

Temperature sensor 14 reaches a temperature based on thermal conditions in warming, zone 13, which are the same thermal conditions affecting food product 12, and sends a signal over cable 22 to closed loop controller 24, which is in turn connected by a cable 26 to radiant heater 20. Controller 24 activates and deactivates radiant heater 20 such that radiant heater 20 is not operated continuously, but, rather, is operated intermittently in order to maintain a desired set point temperature. Controller 24 may be any suitable apparatus that operates a power switch in response to a temperature sensor including, for example, a computer responsive to an electronic signal from an electronic sensor, or a switch in combination with a bulb and capillary thermostat. Controller 24 may also be a contactor whose coil is connected to the contacts of a mechanical thermal switch or a silicon controlled rectifier (SCR) package with a proportional control process computer sensing the temperature through a device whose electrical characteristic changes with temperature and reacts to an algorithm assuring a smooth and gradual temperature change. In an embodiment using fried chicken, experiments showed that the temperature variation measured in food product 12 using on-off control was well within acceptable limits. Other suitable means which enable radiant heater to be activated and deactivated based on a comparison of a sensed temperature and a desired set point temperature will become readily apparent to those skilled in the art, given the benefit of this disclosure. This closed loop control of radiant heater 20 allows control of the temperature of food product 12 in warming zone 13 and takes into account the effect of external variables such as voltage fluctuations and air temperature fluctuations.

In certain preferred embodiments, temperature sensor 14 has an emissivity, heat capacity, surface texture, surface area and general geometry which are substantially the same as food product 12. For example, when food product 12 is fried chicken, temperature sensor 14 is shaped substantially like, has substantially the same texture as, and has substantially the same heat capacity and emissivity as a piece of fried chicken. Thus, temperature sensor 14 has heat gain (absorption) and heat loss characteristics which are substantially the same as the heat gain and heat loss characteristics of food product 12 and will reach temperature equilibrium at a value near that of food product 12. Temperature sensor 14 also receives radiation and is cooled by emission and convection currents in a manner substantially the same as food product 12. Therefore, control of the heating of food warmer 2 is more directly related to the needs of food product 12, and the quality and consistency of the food product can be more accurately maintained.

Figure 3:
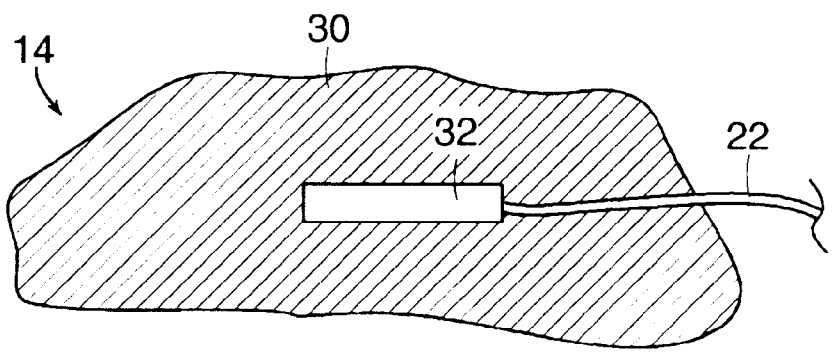
FIG. 3 is a schematic section view of an embodiment of the sensor of the food warmer of FIG. 1, showing a sensing element contained within a base member.

Temperature sensor 14, as seen in FIG. 3, may comprise base member 30 and sensing element 32 disposed therein. Base member 30 preferably has the substantially the same shape, emissivity, heat capacity, surface area and texture as food product 12. Sensing element 32 is connected by cable 22 to controller 24, seen in FIG. 1.

Figure 4:
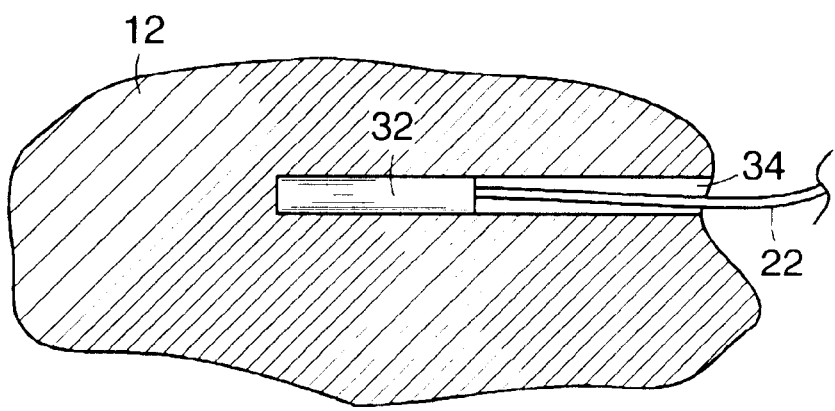
FIG. 4 is a schematic section view of an embodiment of a sensing element of the food warmer of FIG. 1 inserted into a food product.

In another preferred embodiment, as seen in FIG. 4, sensing element 32 may be inserted into food product 12 itself, such as a potato or piece of fried chicken, forming a channel 34 as sensing element 32 is inserted therein. Such a configuration assures that sensing element 32 and food product 12 work together to properly measure the temperature sensed by food product 12.

Figure 5:
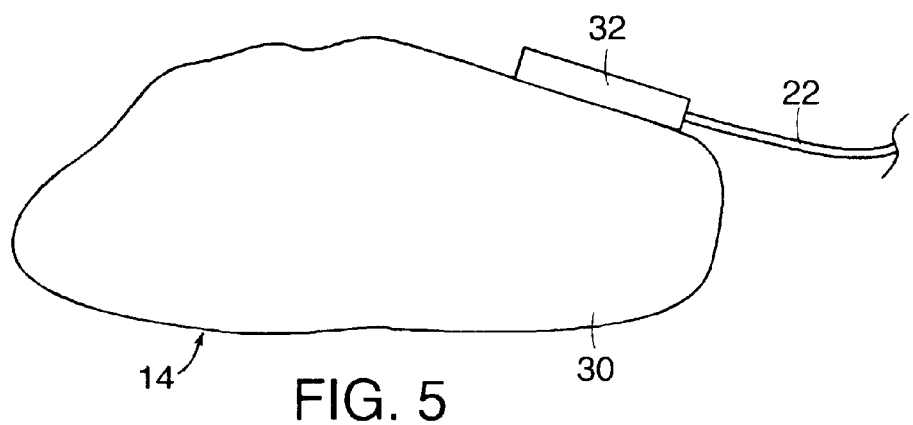
FIG. 5 is a schematic elevation view of an alternative embodiment of the sensor of the food warmer of FIG. 1, showing a sensing element secured to a base member.

Alternatively, sensing element may be secured to an exterior surface of a base member 30, as seen in FIG. 5. Base member 30 may be formed of metal, rubber, plastic, ceramic, or other suitable material which has substantially the same shape, size, surface area, thermal characteristics and emissivity as food product 12. One experiment used a 45° elbow formed of metal with a sensing, element disposed therein.

Sensing element 32 may be for example, a thermocouple, a mechanical sensor such as a bulb and capillary device mechanically linked to a switch, or an electronic type sensor which sends an electronic signal to a computer. Other suitable sensing elements will become readily apparent to those skilled in the art, given the benefit of this disclosure.

Figure 6:
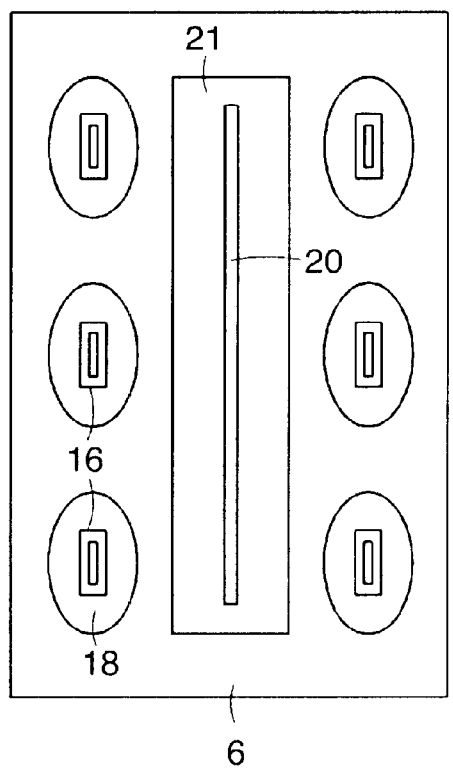
FIG. 6 is a schematic plan view of the food warmer of FIG. 1 showing lamps and a radiant heater secured to a hood of the food warmer.

As seen in FIG. 6, in one preferred embodiment, two rows of lamps 16 are positioned along the sides of and extend along a length of hood 6. Radiant heater 20 is positioned between the two rows of lamps 16. It is to be appreciated that their positions may be reversed. That is, in other preferred embodiments, each of a pair of radiant heaters 20 could be positioned along the sides of hood 6 with lamps 16 positioned between the pair of radiant heaters 20. As shown in FIG. 6, there are three lamps 16 in each row, however, the actual number of lamps may vary based on the size of food warmer 2, the size of lamps 16, operating conditions and other parameters. The appropriate size and location of lamps 16 and radiant heater 20 will become readily apparent to those skilled in the art, given the benefit of this disclosure.

Other mixtures of lamps and radiant heaters could be used in food warmer 2, provided that warming zone 13 is substantially uniformly heated by both the lamps and radiant heaters. Additionally, the heat from either the lamps or the radiant heaters is insufficient to provide the required heat to maintain food product 12 in warming zone 13 at the desired temperature. The combined heat from both the lamps and the radiant heaters must exceed the heat required under normal operating conditions so that the system can provide sufficient heat under adverse or extreme circumstances.

In other preferred embodiments, other heat sources may be used in addition to, or, optionally, in place of the lamps or radiant heaters discussed above. For example, a resistive element may be added to tray 13 which would provide conductive heat to food product 14 contained within tray 1I3. Such a resistive element could be operated under closed loop control through temperature sensor 14. Thus, temperature sensor 14 would, in such an embodiment, be constructed so as to absorb conductive heat in substantially the same way as food product 12. Other suitable sources of heat will become readily apparent to those skilled in the art, given the benefit of this disclosure. Accordingly, temperature sensor 14 will be constructed to take into account the types of heat sources providing heat to food product 12 in order to have heat gain and heat loss characteristics which are substantially the same as food product 12.

In light of the foregoing disclosure of the invention and description of the preferred embodiments, those skilled in this area of technology will readily understand that various modifications and adaptations can be made without departing from the true scope and spirit of the invention. All such modifications and adaptations are intended to be covered by the following claims.

What is claimed is:

1. A heating control for a food warmer comprising, in combination:

a housing having a warming zone;

a temperature sensor in the warming zone having a rate of heat absorption and a rate of heat loss substantially the same as a selected food product;

a first heat and light source to provide heat continuously to the warming zone; and a second heat source to provide heat to the warming zone in intermittent fashion to maintain a desired set point temperature of the warming zone;

wherein the heat required to maintain the warming zone at a desired temperature requires heat from both the first heat source and the second heat source.

2. The heating control according to claim 1, wherein the first heat source is oriented to project heat over substantially the entire warming zone.

3. The heating control according to claim 1, wherein the second heat source is oriented to project heat over substantially the entire warming zone.

4. The heating control according to claim 1, further comprising a controller responsive to a signal from the temperature sensor to activate and deactivate the second heat source to maintain a desired set point temperature of the warming zone.

5. The heating control according to claim 1, wherein the temperature sensor has a shape substantially the same as a selected food product.

6. The heating control according to claim 1, wherein the temperature sensor has a surface texture substantially the same as a surface texture of a selected food product.

7. The heating control according to claim 1, wherein the first heat source comprises a plurality of quartz lamps.

8. The heating control according to claim 1, wherein the first heat source comprises two rows of lamps, the second heat source being positioned between the two rows of lamps.

9. The heating control according to claim 1, wherein the second heat source comprises a radiant heater.

10. The heating control according to claim 1, wherein the temperature sensor includes a thermocouple.

11. The heating control according to claim 1, wherein the temperature sensor is contained within a base member, the base member having a shape substantially the same as a shape of a selected food product.

12. The heating control according to claim 1, wherein the temperature sensor is secured to a surface of a base member, the base member having a shape substantially the same as a shape of a selected food product.

13. The heating control according to claim 1, further comprising a plurality of reflectors, each reflector adjacent one of a light source and a radiant heat source to reflect light and heat toward the warming zone.

14. A heating control for a food warmer comprising, in combination:
   a housing having a warming zone;
   a temperature sensor in the warming zone;
   a light source to warm and illuminate food product contained in the warming zone; the light source being operated continuously while food product is in the warming zone
   a radiant heater to warm food product in the warming zone, the heat required to maintain the food product at a desired temperature requiring heat from both the light source and the radiant heater; and
   a closed loop controller responsive to a signal from the temperature sensor to control operation of the radiant heater to maintain a desired set point temperature of the warming zone.

15. The heating control according to claim 14, wherein the temperature sensor absorbs heat and transmits heat in substantially the same manner as a selected food product.

16. A heating control for a food warmer comprising, in combination:
   a housing having a hood and a base, the base having a warming zone;
   a temperature sensor in the warming zone;
   a plurality of lamps secured to the hood, to provide light and heat to food product contained in the warming zone, the lamps being operated continuously while food product is in the warming zone;
   a plurality of lamp reflectors, each of the lamp reflectors being positioned adjacent a lamp to direct light and heat toward the warming zone;
   a radiant heater secured to the hood, to provide heat to warm the food product in the warming zone, the heat required to maintain the food product at a desired temperature requiring heat from both the lamps and the radiant heater;
   a radiant heater reflector adjacent the radiant heater to direct heat toward the warming zone; and
   a closed loop controller responsive to a signal from the temperature sensor to control operation of the radiant heater to maintain a desired set point temperature of the warming zone.

17. A heating control for a food warmer comprising, in combination:
   a housing having a warming zone;
   a temperature sensor in the warming zone having a rate of heat absorption and a rate of heat loss substantially the same as a selected food product;
   a light source to continuously warm and illuminate a food product in the warming zone;
   a radiant heater to warm a food product in the warming zone; and
   a closed loop controller responsive to a signal from the temperature sensor to control operation of the radiant heater to maintain a desired set point temperature of the warming zone.

* * * * *